United States Patent

[11] 3,608,655

[72] Inventors Robert H. Ray
Cinnaminson;
John M. Holt, Cherry Hill, both of N.J.
[21] Appl. No. 12,998
[22] Filed Feb. 20, 1970
[45] Patented Sept. 28, 1971
[73] Assignee Applied Information Industries

[54] COMPUTER WEIGHER SYSTEM WITH INTERMEDIATE PRICE CALCULATIONS AND DISPLAY
5 Claims, 2 Drawing Figs.

[52] U.S. Cl. .................................................. 177/1,
177/5, 177/DIG. 1, 177/DIG. 3
[51] Int. Cl. ........................................................ G01g 23/38
[50] Field of Search ............................................ 177/1.3–6,
DIG. 1, DIG. 3; 235/58 PS, 61 PS

[56] References Cited
UNITED STATES PATENTS
2,963,222 12/1960 Allen ............................. 235/61 PS X
3,170,624 2/1965 Allen ............................. 177/3 X
3,532,865 10/1970 Karp et al. ...................... 177/3 X Primary Examiner—Richard B. Wilkinson
Assistant Examiner—George H. Miller, Jr.
Attorney—Morton C. Jacobs ABSTRACT: A computer weigher system employs a continuously operating digital computer which multiplies unit price information supplied via a manual keyboard times the weight information supplied via a weigher which incorporates a digitizer for converting the weight information to digital form. From the moment that the article is first placed on the weigher scale until the weigher platform comes to balance, successive intermediate weight measurements are made as the platform moves to balance, and the computer arithmetic unit continuously operates to develop the total price for each such weight measurement. A display device continuously displays the unit price together with the weight measurement as it varies from the zero ;measurement to the final balance measurement, as well as the total price at each measured weight. An operator can determine when the weigher platform has come to balance from the displayed weight, and when the later is unchanged, the operator presses a print button which initiates the operation of a printer to print out the weight and total price as well as the input unit price.

INVENTORS
Robert H. Ray &
John M. Holt
ATTORNEY

COMPUTER WEIGHER SYSTEM WITH INTERMEDIATE PRICE CALCULATIONS AND DISPLAY

BACKGROUND OF THE INVENTION

This invention relates to computer weigher systems, and particularly to such systems adapted for supermarkets and other common uses.

Computer weigher systems are useful in supermarkets for checkout of a customer's purchases, as well as in various store departments such as the delicatessen or meat department. Automatic computer weighers have been available heretofore, especially in the meat department where large quantities of meat items may be prepackaged and weighed. The following patents illustrate fully automatic computer systems which are described as useful for this purpose: U.S. Pat. No. 3,439,760, U.S. Pat. No. 3,262,639, U.S. Pat. No. 3,163,247. However, for supermarket checkout and for other uses, a computer weigher is desirable which is similar in its mode of operation to the weighers that supermarket customers and clerks are familiar with; for example, similar to the conventional drum weigher which supplies a continuous visual indication of the changing weight measurement as the platform moves down under the article being measured as well as an indication of the total price for each weight. In addition, a computer weigher less expensive in price than presently available weighers is needed in order to provide for widespread application and use.

SUMMARY OF THE INVENTION

Accordingly, it is among the objects of this invention to provide a new and improved computer weigher system.

Another object is to provide a new and improved computer weigher system which is sufficiently inexpensive in price to permit widespread use.

Another object is to provide a new and improved computer weigher system which may be attached to platform weighers of the type used presently in supermarkets.

Another object is to provide a new and improved computer weigher system which operates in a manner familiar to supermarket customers and clerks.

In accordance with one embodiment of this invention, the data of a weighed article is developed in digital form by means of sensors of the weigher platform position and a suitable digitizer. A combination of digital signals is developed representative of each platform position as it moves in response to the weight of the article. This changing weight information is established continuously in the weight register. A keyboard is used for manual entry of a unit price and for supplying the digital representation to a unit price register. An arithmetic unit operating repeatedly and continuously under control of a program control develops the total price by multiplying each registered weight by the entered unit price, and supplies each such calculated total price of an accumulator, from which each is repeatedly sent out to display devices which also receive the unit price and the corresponding weight information for visual display to the customer and operating clerk in a supermarket. The arithmetic unit operates sufficiently quickly (e.g. the order of tens of milliseconds or less for a complete cycle) so that scores of individual changes in the weight and total price that are displayed actually take place per second. Within a few seconds, the weigher platform comes to balance and this is clearly indicated to both the customer and the clerk by the fact that the display of weights and total prices stops changing. When this occurs, the clerk knows that the final weight is registered and presses a print button for actuating a switch and for initiating the transfer of the displayed information to a printer which prints out a label with that information.

BRIEF DESCRIPTION OF THE DRAWING

The foregoing and other objects of this invention, the various features thereof, as well as the invention itself, may be more fully understood from the following description when read together with the accompanying drawing, in which.

In the drawing, corresponding parts are referenced throughout by similar numerals.

DESCRIPTION OF A PREFERRED EMBODIMENT

Figure 1:
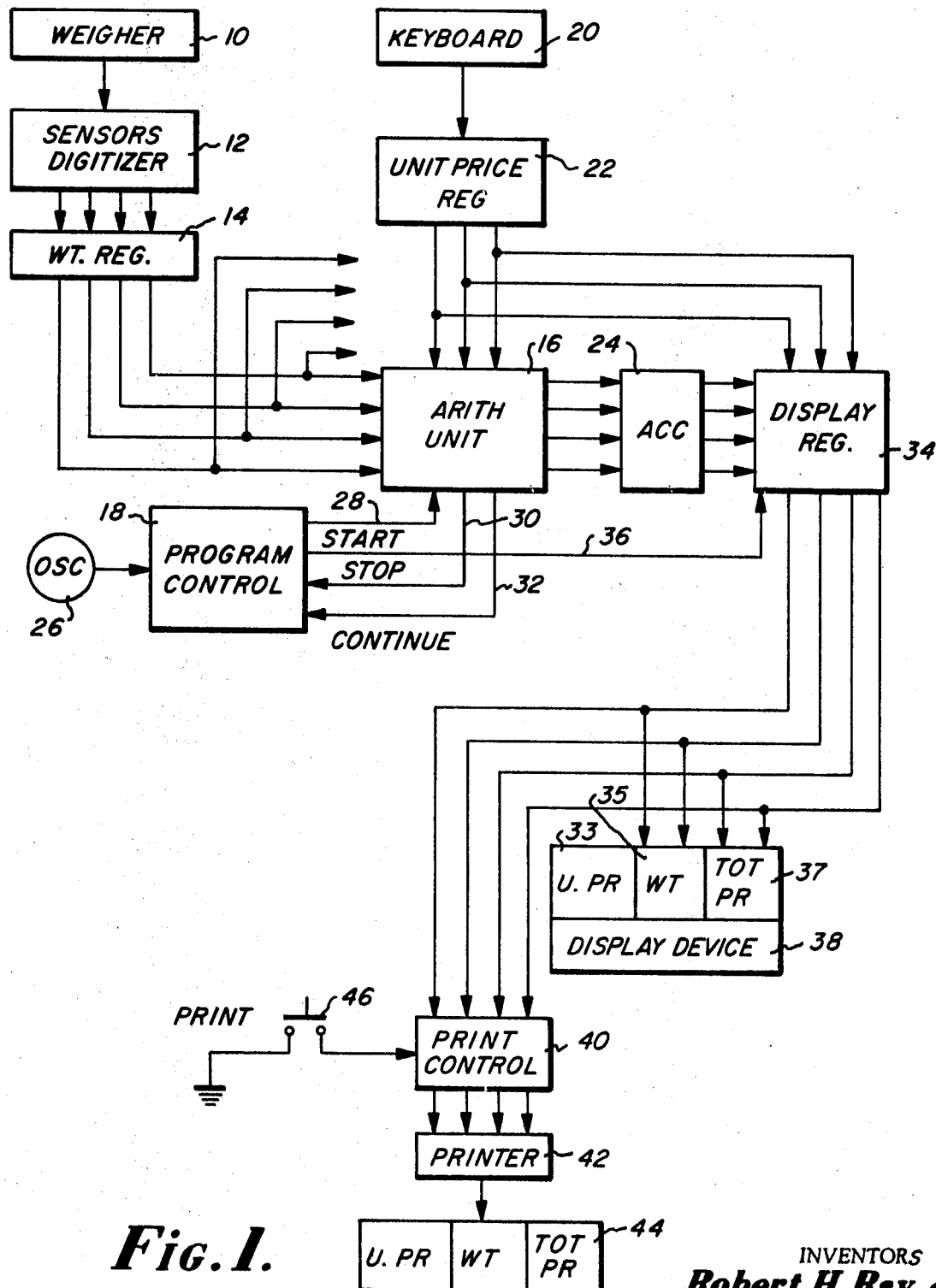
FIG. 1 is a schematic block diagram of a computer weigher system embodying this invention.

The system of FIG. 1 includes a weigher 10, together with suitable sensors and a digitizer 12 for developing the weight information at each position of the weigher and for producing that information in a combinatorial digital form. Conventional platform scales may be used for this purpose, and suitable techniques for developing a combinatorial digital signal for the weight data are known in the art and are described in the aforementioned patents.

The combinatorial digital data for the sensed weight is supplied to a weight register 14 and established there, and on a regular basis supplied to an arithmetic unit 16 under control of a program control 18. A manually operated keyboard 20 is used by a clerk or other operator to establish in digital form the unit price of the article being weighed. The program control similarly transfers the unit price data in register 22 to the arithmetic unit 16, where the unit price and the weight data are multiplied and the product data is supplied to an accumulator 24. The program control 18 receives a continuous train of pulses from an oscillator 26, and develops a program-cycle count which is repeated continuously. At one count, a start signal via line 28 is supplied to the arithmetic unit, which sends a stop signal via line 30 to the program control 18 to stop its count, and proceeds to perform the arithmetic operations required in the multiplication of the data established in the registers 14 and 22. The program control preferably supplies timing signals to the weight register 14 and the nut price register 22 to control the transfer of data signal therein prior to their transfer to the arithmetic unit 16.

Upon completion of the arithmetic operation, the unit 16 supplies a continue signal to the program control 18 to have it resume its operation for the next cycle, and to complete the remainder of the operations required to produce a display of the data in the registers 14, 22 and 24. For this purpose, a display register 34 receives at certain times controlled by timing signals from the program control 18 supplied via lines 36, data established in the registers 14, 22 and 24. A display device has three display sections 33, 35, 37 respectively associated with unit price, weight, and total price. The display device 38 may take various forms whereby numeric data may be displayed; suitable types of display tubes for this purpose are will know in the art. Thus, regularly under control of the program control 18, during the time that the weigher platform is moving toward its balance position, the display register 34 receives the data from the weight register 14 and establishes that data in the weight section 35 of the display. Similarly, the unit price data in the register 22 is established in section 33, and the corresponding total price data in the accumulator 24 is set up in display section 37.

The display register 34 also supplies the data established therein via the print control 40 to a printer 42 which functions to print out a label or ticket 44 carrying the unit price, weight, and total price data. A manual print switch 46 is effective to actuate the print control 40 and enable the transfer of data from the register 34 to the printer 42.

In operation, a clerk manipulates the keyboard 20 to enter in register 22 the unit price for a particular article being weighed, which article is placed on the weigher platform in the customary fashion. As the weigher platform moves under the weight of the article, the sensors and digitizer 12 repeatedly establish digital signal representations of the weight as it changes, and supply those signals to the weight register 14.

The program control 18 actuates the arithmetic unit 16 repeatedly to multiply the price in the register 22 by the weight in the register 14 and develop the total price in the accumulator 24. Each such cycle of the program control includes not only a sampling of the weight and establishing it in the weight register 14 and the development of the total price in accumulator 24, but also a display readout of those two continuously changing items to the display device 38. For this purpose, the registers 14, 22 and 24 have their contents transferred successively to the display register 34 from which they are entered into the corresponding display tubes in the display device 38. Thus, the customer and the operating clerk have displayed before them, by means of device 38 in the separate sections thereof, the unit price which will generally be set once in register 22, as well as the weight and total price as they change continuously and are repeatedly sampled by means of the program control.

When the weight and correspondingly the total price stop changing, it is then clear to both the customer and the clerk that the weigher is in balance and the final weight and total price are being displayed. Thereupon, the clerk actuates print button 46 to initiate a transfer of the contents of registers 14, 22 24 and to the printer 42, whereupon a label 44 is printed with the same data as that displayed in device 38. Thereafter, the article being weighed may be removed from the weigher platform and another article placed thereon. The unit price for the new article is entered via keyboard 20 and the operation repeats itself in the manner described above. Thus, the operation simulates present-day mechanical weighers which are familiar to both the clerk and the customer. That is, the displayed weight data (and corresponding total price) in device 38 change quickly as the weigher platform moves; the displayed weight data accurately tracks the weigher platform and stops changing when the platform has settled down. Instead of writing out a label with the displayed weight and price information the operator need only press the print button 46 to initiate the automatic printing of the displayed data on the label 44. With the timing of the print operation under the control of the user, adequate time is available to the user to view the display with confidence in the weight measurement and total price calculation.

Figure 2:
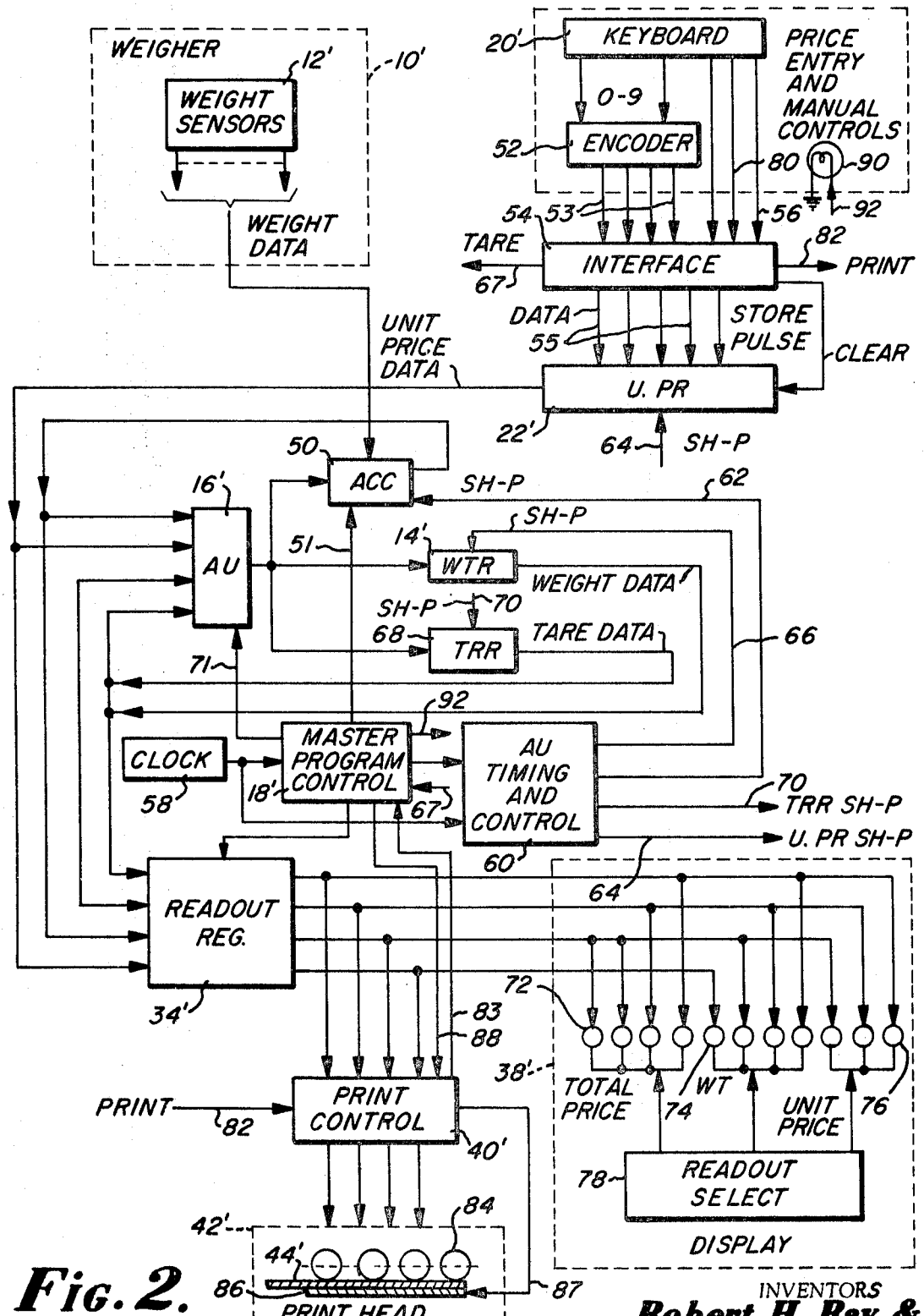
FIG. 2 is a schematic block diagram illustrating the computer weigher system of FIG. 1 in greater detail and in accordance with a particular form of the invention.

A particular system embodying this invention is illustrated in FIG. 2; parts corresponding to those previously described, but with modification, are referenced by the same numerals with the addition of a prime ('). In FIG. 2, the weigher 10' preferably has weight sensors 12' that develop directly in digital form binary coded signals representing the position of the weigher platform at each fraction of a pound (for example, one-hundredth of a pound).

For this purpose, a chart which is coded positionally in Graycode in parallel columns (e.g. 12 columns) may be connected to the weigher platform to be moved thereby, and its position with respect to a reference zero-weight position may be sensed photoelectrically with light shining on the chart and reflected to a battery of photocells, one for each column of code. In one form, the chart may be wrapped around the conventional drum used in platform weighers for retail food stores where the drum carries data in addition to the conventional 12 or 15 pound range of weight indications. One form of known Graycode chart which may be used for the weight sensors 12' is illustrated in U.S. Pat. No. 3,439,760. Alternatively, a shaft encoder coupled for movement to the platform may be used to develop a binary code for each platform position; or an analog electrical signal may be developed in accordance with the platform position, and an analog-to-digital converted used to develop the desired coded signals.

The 12-bit coded combination from the weight sensors 12' is supplied in parallel to an accumulator 50, which takes the form of a shift register having twelve serially connected stages, one for each bit of data. The register 50 may be, for example, one in which flip-flops are serially connected and transfer their binary state seriatim from one stage to the following stage in response to shift pulses which are applied thereto. Such shift registers are well known in the art. The time of transfer of weight signals into and out of the accumulator is controlled by a master program control 18' via line 51.

A second input to the system is the unit price data which is entered by means of the keyboard 20, which may take the form of a 0–9 set of pushbuttons actuating electrical switches in the fashion of the modern-day telephone selector keyboard. The 10 such switches for the keyboard are connected via individual lines to an encoder 52, which may be a diode matrix in a form well known in the art, for developing on four lines 53 combinatorial signals encoded in BCD (binary coded decimal) form and representing each one of the zero to nine input switches. An interface circuit 54 properly shapes the signal supplied by the encoder and substantially eliminates noise and transients in the price signals such as those due to switch bounce produced with the manual operation of the keyboard. Four lines 55 of BCD data are connected in parallel from interface 54 to the unit price register (UPR) 22' which is a 12-stage binary shift register of a form similar to that of the accumulator 50. A store pulse accompanying the BCD actuates UPR to accept the unit price data, and program control 18' supplies a control signal to time the entry of this BCD data near the beginning of each program cycle. A clear switch on the keyboard 20 is connected via a line 56 through the interface 54 to UPR and is operated to clear its contents just before the operator enters a different unit price.

Overall timing and control of the system is in the master program control 18', which receives successive pulses from a clock (for example, at a 250 kHz. rate). The master program control 18' goes through a cycle broken down into eight different stages or counts during which different portions of the system are directed in the performance of their function. The control 18' supplies count signals C–0 to C–7 to an arithmetic unit timing and control 60, and the latter develops shift pulses for operating the different portions of the system associated with the arithmetic unit 16', and with certain output devices to be described. In particular, the timing and control 60 develops shift pulses (Sh.P) for the accumulator 50 which are supplied thereto via line 62, and for the UPR 22' which are supplied thereto via line 64.

In one particular form of the invention, the program C–0 to C–7 takes the form described hereinafter, though it will be appreciated from the description that other forms of program may be used with this invention. During C–0 of each program cycle, the accumulator 50 is enabled via line 51 to receive the weight data from the sensors 12'; thereby, a repeated sampling of the weight data is performed. Thereafter, during C–1, the data from the accumulator is sent serially under control of the shift pulses on line 62 to the arithmetic unit 16', which is constructed to convert the Graycode data, the form in which it is received, to a BCD form, and thereafter to store it in the weight register WTR 14' (which is also a serial shift register) under the control of shift pulses supplied from the control 60 via line 66. During C–2, the weight data is transferred out of the register WTR serially through the arithmetic unit 16' and back to the accumulator 50. During C–3, if a tare switch in the keyboard is actuated, a tare signal on line 67 enables a tare shift register 68 to receive the two least significant digits of the weight stored in accumulator 50 under control of shift pulses supplied from control 60 via line 70. Thereafter, during C–3 of each successive cycle, there is no further operation performed on the tare, but instead, during C–3 the weight data in the accumulator is recirculated back to WTR via the AU. During C–4 of each cycle, the weight data established in WTR is corrected for tare by subtracting from it the tare data established in TRR by recirculating both through the arithmetic unit 16' which is appropriately programmed via line 71 and with timing determined by the shift pulses from control 60.

During Counts 5, 6 and 7 of each cycle, a multiplication is performed in the arithmetic unit 16'; for many applications of this invention, a unit price to three decimal digits is ordinarily sufficient (dollars and cents up to $9.99). The multiplication is performed in three counts, one for each digit of the unit price in UPR. During C-5 the least significant digit of the unit price is used to multiply the weight data supplied from WTR 14'. The multiplication is performed in the arithmetic unit 16', and may take the form of successive additions of the weight data depending on the value of the unit-price digit to obtain the partial products. Similarly, during C-6, the middle digit from UPR is multiplied with the weight data, and its partial product is added to that developed during C-5. During C-7 the most significant digit is similarly multiplied and its partial product added to that developed during C-6. The partial products are appropriately shifted to be properly aligned for addition. The partial products are temporarily stored in the accumulator 50 and the final product data developed from these multiplications is also established in the accumulator 50. The Counts C-5, C-6 and C-7 are each constructed to have ten subcycles to deal with the multiplication operations and with the readout.

A readout display device 38' is employed to provide a continuous display of the input price, the successive weight measurements sampled during successive program cycles, and the corresponding total-price data generated during each program cycle. For this purpose, a battery of readout devices is provided for displaying each set of numeric data. The numeric display devices 72 are four in number and display numerals corresponding to the four decimal digits of the total price (in dollars and cents) established in the accumulator 50 as a consequence of the multiplication operations. Similarly, the battery of four readout devices 74 establish the four decimal digits corresponding to weight, with the lowest two digits representing tenths and hundredths of a pound. Three devices 76 are used for displaying the unit price entered manually via the keyboard into UPR register 22'. Suitable forms of display devices that may be employed are well known in the art, and one embodiment that has been found useful for the purpose described is that known as Digivac, a vacuum fluorescent readout display lamp manufactured by Tung-Sol Division. The filaments of each of these lamps in a battery 72, 74 or 76 are connected together and driven in common by a readout select circuit 78, which supplies filament select power to the filaments of each battery during different program counts. The readout register 34' takes the form of a 16-stage shift register (four decimal digits with four bits each), which receives at different program counts the unit price data from UPR, the weight data from WTR, and the total price data from the accumulator, which has its stages coupled to the lamps of each battery via a decoder-encoder (not shown).

In operation, during the tenth subcycle of program count C-5, the unit price data is read into the readout register 34' from UPR 22'. Thereafter, during the first nine subcycles of C-6 the readout select 78 supplies filament power to the battery of unit price lamps 76, and at the same time the readout register 34' supplies appropriately coded signals to the segments forming the numerals in each of the lamps. The coding is performed by converting the BCD data for each decimal digit into a 7-bit code required for energizing the different segments associated with each digit to be displayed. During the tenth subcycle of C-6, the weight data from WTR 14' is read into the readout register 34', and during the first nine subcycles of C-7 the readout select supplies filament power to the filaments of the battery weight lamps 74 to establish the numeric character for each of the four weight digits in the associated one of those lamps 74. During the tenth subcycle of C-7, the total price is read from the accumulator 50 (where it was previously established in final from during the preceding counts C-5, C-6 and first nine subcycles of C-7) to the readout register 34'. Thereafter, during counts C-0 to 4 and during the first nine subcycles of C-5, in the next successive program cycle, the readout select 78 supplies filament power to the filaments of lamps 72 to establish the numeric characters for the total price data in lamps 72.

The aforementioned cycle of operation of the master program control continues indefinitely, whether an article is placed on the weigher platform or not, and whether a unit price is entered in UPR or not. When the unit price is entered in UPR 22' via the keyboard 20, thereafter, during each tenth subcycle of C-5, the price is read into the readout register; and during the first nine subcycles of C-6, the filament control establishes that price in the battery of lamps 76. Thereafter, during each program control cycle during counts C-5 and C-6 as mentioned, the unit price is reestablished in the lamps 76. The operation of a program cycle is sufficiently short so that, although there is no maintenance of the energization of the lamp, the fact that it is repeated more often than 30 times a second, the image established each program cycle is maintained by the normal image retention characteristic of the eye. In practice, the overall program cycle may be of the order of 10 milliseconds. For example, each of the program count subcycles may be of the order of 3 milliseconds made up of 10 cycles each, and each such subcycle may be 300 microseconds. The counts C-1 to 4 are ordinarily the order of 300 microseconds, with 20 shift pulses corresponding to each such count. Count C-0 may be a single 15-microsecond pulse for storing the data in the accumulator 50. Thus, with a 10-millisecond overall program cycle, the unit price display is repeated the order of 100 times per second, and thereby appears as a continuous image to the human eye. In practice, a program cycle time may be several times longer with adequate image retention. If there should be any transients occurring in the machine, they would appear only as a momentary flicker in the display. In that way, any error in the data or computation that occurs as a result of the transient does not maintain itself in the display, since the transient itself is of short duration and the correct data is established almost all of the time, and effectively only the correct data is displayed, and it continues unchanged except as the operator changes the unit price.

In a similar fashion, the weight data established in the tubes 74 is changed about each 10-milliseconds. Accordingly, the displayed weight data corresponds to a measurement sampled and established by the weight sensors at each period of time corresponding to count C-0 of each program cycle, when the weight data is established in the accumulator 50 and assumes a momentarily staticized form until changed during the next program cycle. Accordingly, the weight presented in the battery of weight lamps 74 represents a continuing monitoring or tracking of the movement of the weigher platform and changes about 100 times a second to provide to the human eye a natural change of the measurement corresponding the the conventional human experience in any rapidly changing device such as that of the weigher itself. Thus, the information displayed in the weight lamps 74 appears to be changing naturally in real time relationship and in the same fashion as the ordinary mechanical scale with which an operator or customer may be familiar. Likewise, the total price 72, representing as it does the product of the unit price and weight, is a continually changing set of data as the weight itself changes. Moreover, the unit price itself may be readily cleared and changed during the course of the weighing operation, as explained above; if so changed, the unit price is changed at the display lamps 56 and correspondingly, the multiplier for establishing the total price in lamp 72 is likewise changed.

Thus, the readout display provides a simulation of conventional scale operation which, from a human engineering standpoint, is a very natural one to both the clerk and the customer in a retail establishment. In this connection, the display device 38' may be provided, at least as far as the lamps 72, 74, 76 are concerned, in duplicate form so that they can be read simultaneously by both the clerk and the customer from opposite sides of a scale at a supermarket checkout counter.

The logic control for performing the various operations described above may be in the form of integrated circuitry using NAND and NOR logic, such as that known as TTL. Logic circuitry for performing the above-described operations in the time periods indicated is available commercially.

Normally, it takes but a second or a few seconds for the weigher platform to reach its balance position under the conventional damping mechanisms which are employed with ordinary scales, and over this time scores, or a 100 or even hundreds of separate measurements of the weight are made, and corresponding multiplications to obtain the total price are also made. When the weigher reaches its balance position, the weight value no longer changes, nor does the total price. At that time, the program continues through counts C–0 to 7 in the manner described, and the display is continually reestablished. The keyboard at that time may be used to clear the unit price established in UPR 22', and if so, the unit price lamps 76 register all zeros, as do the total price lamps 72. Moreover, the price may be reinserted at the keyboard 20, for example, if a customer should point out an error made by the clerk in entering such a price. Upon a new unit price being established in UPR 22' in the manner described, the lamps 76 display that new price, and the subsequent multiplications produce a new total price and a corresponding display at lamps 72. When the weight and total price no longer change, the weigher platform has reached a balance and the indication in lamps 72 and 74 corresponds to that which would normally be read by the customer and/or clerk by looking at the mechanical indication of the scale, together with any calculation that was established on a drum chart.

For purposes of achieving a printed output, for example, in the form of a printed label that may be applied to a package, a printer is employed which includes a print control 40' and a printhead 42'. A push button switch is provided on the keyboard 20, and connected via lines 80 and 82 to the print control 40'. The effect of this signal on line 82 is to initiate the print operation by actuating the print control 40'. The latter in turn sends a signal via line 83 to the program control 18' so that the first portion of the cycle is effectively disabled; that is, counts C–0 to 4 are abbreviated, and the operations normally performed during those counts are blocked out, so that there is effectively no change of the weight data set up in WTR 14'. However, the multiplications performed during C–5, 6 and 7 continue to be performed and the display information in display 38' is continually reestablished without change.

The printhead 42' consists of four print wheels, one for each of the decimal digits in the total price or in the weight, and three of these wheels are used for printing the three-digit unit price. The print wheels 84 are pressed against a paper ticket or label 44', and imprinted under the actuation of a platen 86 which is moved under control of a solenoid (not shown) when an appropriate imprint signal is received via line 87 from the print control 40'. The print wheels 84 may each take the form, known commercially in the art, of a wheel which is stepped from a zero position to any selected decimal position up to nine; a train of pulses corresponding in number to the digit to be printed steps the wheel, by means of a ratchet or the like, to the corresponding decimal position. Such wheels may also be returned to the zero position by applying a long train of pulses to them, which is effective to restore the wheel to the zero position, at which point the remainder of the pulses applied to it are effectively disabled by a switch.

Several program cycles are required to establish the digit in each print wheel 84 and to complete the operation of actuating the platen 86 to imprint the set of four digits for a particular item and to advance the tape 44' (e.g. by means of a suitable reeling motor, not shown) to the next position for the next item to be imprinted. During the tenth subcycle of a first C–6 following the print signal on line 84, one digit of the weight information established in readout register 34' is transferred in parallel to a four-stage register connected as a counter in print control 40'; the print control 40' is synchronized to the operation of control 18 and the readout register 34' via line 88. Thus, starting with the least significant digit for the weight, that digit is established in the counter just mentioned, and thereafter a stream of relatively slow pulses (e.g. each about 40 milliseconds) is supplied to the least significant digit wheel 84, corresponding in number to the BCD digit established in the counter, and the wheel 84 is properly positioned. During the wheel positioning, the print control operates at its own slow rate decoupled from control 18' until the wheel is set. Thereafter, control 40' is again synchronized with readout register 34', and during the next count C–6, the second least significant digit is transferred, and then the operation is repeated to position its wheel. Similarly, during the next C–6, the third significant digit of weight is transferred to the print control, and then the third wheel is positioned accordingly; and thereafter, during a following C–6, the most significant weight digit is established in the print control and a corresponding train of pulses positions the most significant wheel 84.

At the end of this set of operations (which may take a second or more), an imprint pulse actuates the print solenoid for the platen 86 to cause the imprinting of the label 44' with the weight data. Following that, a train of pulses from control 40' resets all of the wheels to the zero position, and a reeling operation (not shown) is effective to step the label to a next free space for receiving the total price information. For this purpose, the total price information is transferred, digit by digit, into the control register in the same fashion as that described for the weight data except that it takes place during the counts C–7 of the various program cycles over which this is required. In a similar fashion, after the total price has been set up in the wheels and imprinted and the label 44' reeled and stepped to the next position that is free for receiving the unit price data, the unit price data is supplied during counts C–5 of a number of program cycles.

Thus, over the course of a few seconds or so, the data is transferred from the readout register and established at the printhead. The transfer operations are completely synchronized to the continuing performance of multiplication during C–5, 6 and 7 in the arithmetic unit and the reestablishment of the data in the readout register 34'. Between each transfer of a digit, the print control operates at its own slow pace to set up the digit in the proper print wheel 84, and is then able to resynchronize for the next digit transfer.

When the label 44' is fully imprinted, it is reeled out of the printhead 42', so that it can be picked up and attached to the weighed article. Upon completion of this print operation, the print control sends a reset signal to unblock the program control 18' and to clear the tare register TRR and to generally restore the computer system to its initial condition, whereby it is ready for the processing of the next article to be weighed and priced. Preferably, the entry of the tare weight in TRR is accompanied by the setting of a switch in control 18' and the lighting of a lamp 90 at the keyboard via line 92, which condition is maintained so that the operator is continually reminded that the displayed weight is a net weight with the tare subtracted out. Upon the reset of control 18' at the end of the print operation, the tare lamp 90 is extinguished, which condition advises the operator to reinsert tare for the next article to be weighed.

Thus, in accordance with this invention, a new and improved computer weigher is provided which is constructed to repeatedly sample the weight in the short time that the weigher platform comes to balance, to repeatedly compute the net weight and total price, and to display it. In addition, a manually initiated print operation may be provided in the system. Various modifications of the invention will be apparent to those skilled in the art from the foregoing description, which is presented by way of example of one form of the invention.

What I claim is:

1. A computer weigher system comprising:
   a weigher including means for producing digital representations of the weight of an article being weighed before and after the weigher comes to balance,
   manual keyboard means for generating a digital representation of unit price of the article;
   means for repeatedly multiplying said weight representations by said unit price representations to obtain total price representations;
   and means for repeatedly displaying said weight representations and said total price representations, whereby the data display appears to change continually before the weigher comes to balance and appears to remain unchanged after balance.

2. A computer weigher system as recited in claim 1 and further comprising:

means for printing a record of said weight and total price representations, including a manually operated print-controlling switch for actuating the printing of the record, whereby an operator can initiate the printing of said record when the displayed representations appear to remain unchanged.

3. A computer weigher system as recited in claim 1 wherein said multiplying and displaying means each operate repeatedly at least about 30 times per second whereby the image of the display is effectively continuous for the operator.

4. A computer weigher system as recited in claim 1 and further comprising:

selectively operable means for sorting digital tare weight representations;

and wherein said multiplying means includes means for repeatedly subtracting said tare representations from said weight representations prior to each repeated multiplication.

5. A computer weigher system comprising the process steps of:

repeatedly generating electrical representations of the weight of an article while it is being weighted;

repeatedly multiplying said weight representations by a certain unit price factor to obtain total price representations;

and repeatedly displaying said weight and total price representations.